No. 777,041. PATENTED DEC. 6, 1904.
H. MAUST.
LABEL AFFIXING MACHINE.
APPLICATION FILED DEC. 11, 1903.
NO MODEL. 6 SHEETS—SHEET 2.
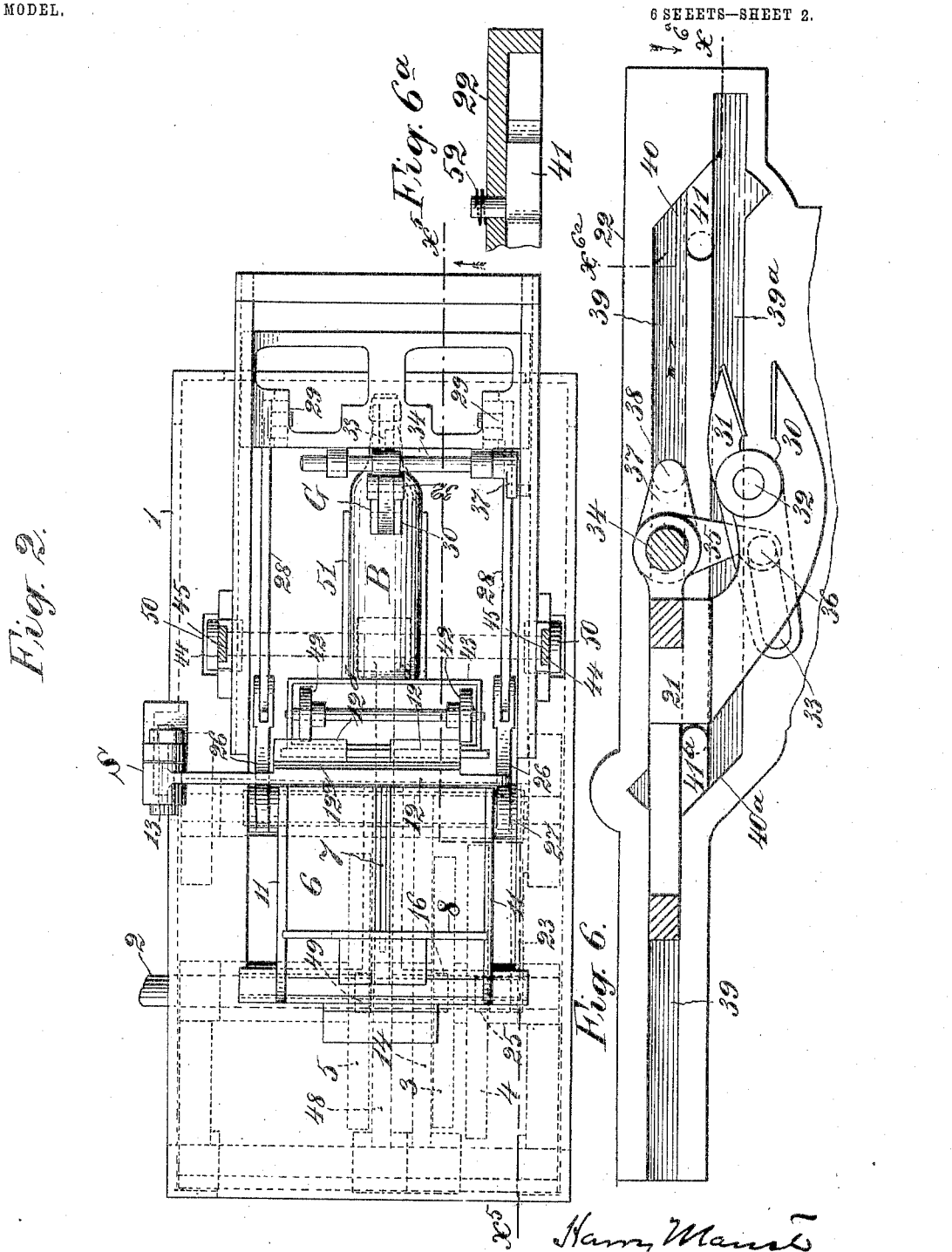
Witnesses
Harry Maust
Inventor
By his Attorney No. 777,041. PATENTED DEC. 6, 1904.
H. MAUST.
LABEL AFFIXING MACHINE.
APPLICATION FILED DEC. 11, 1903.
NO MODEL. 6 SHEETS—SHEET 3.
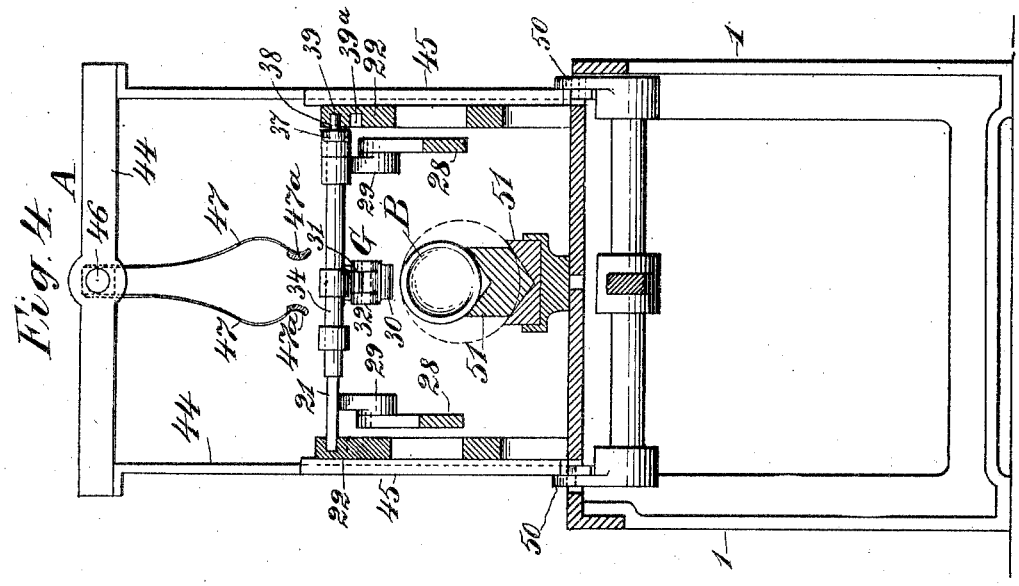
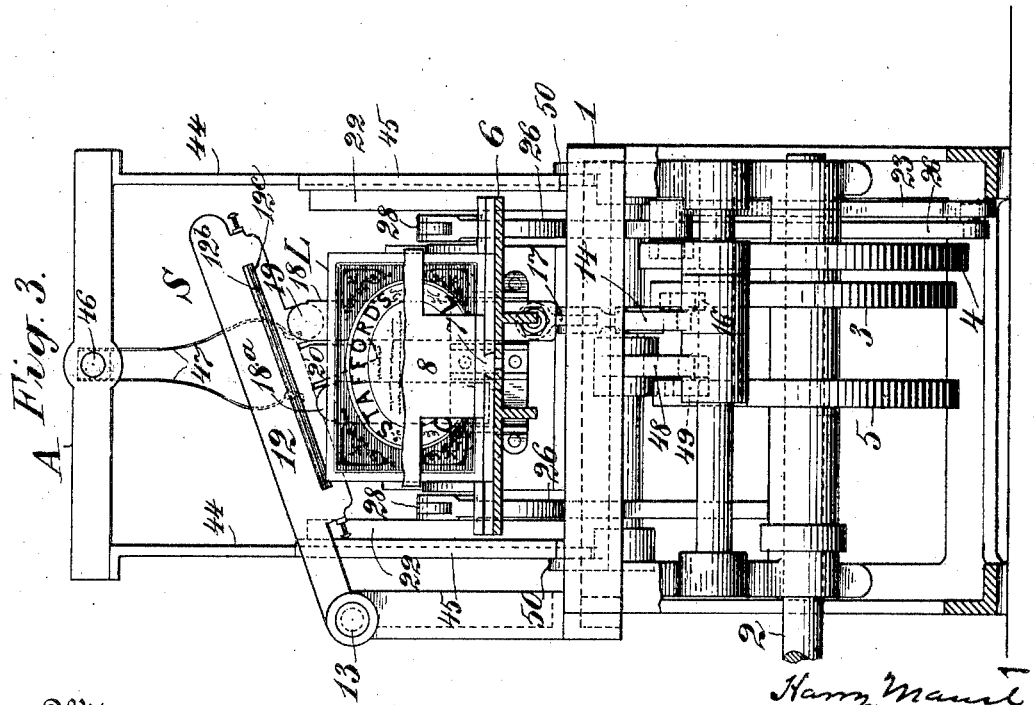

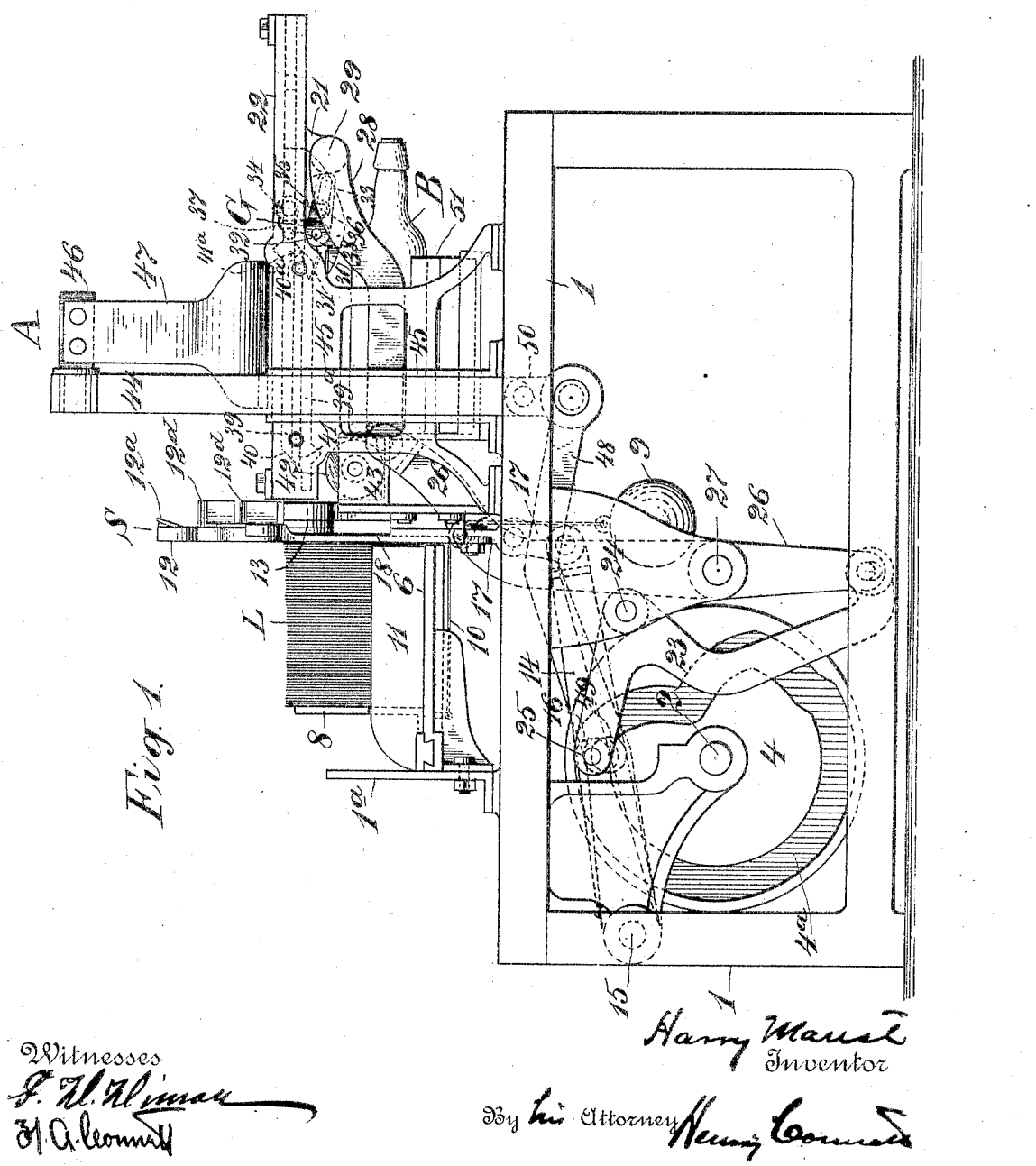

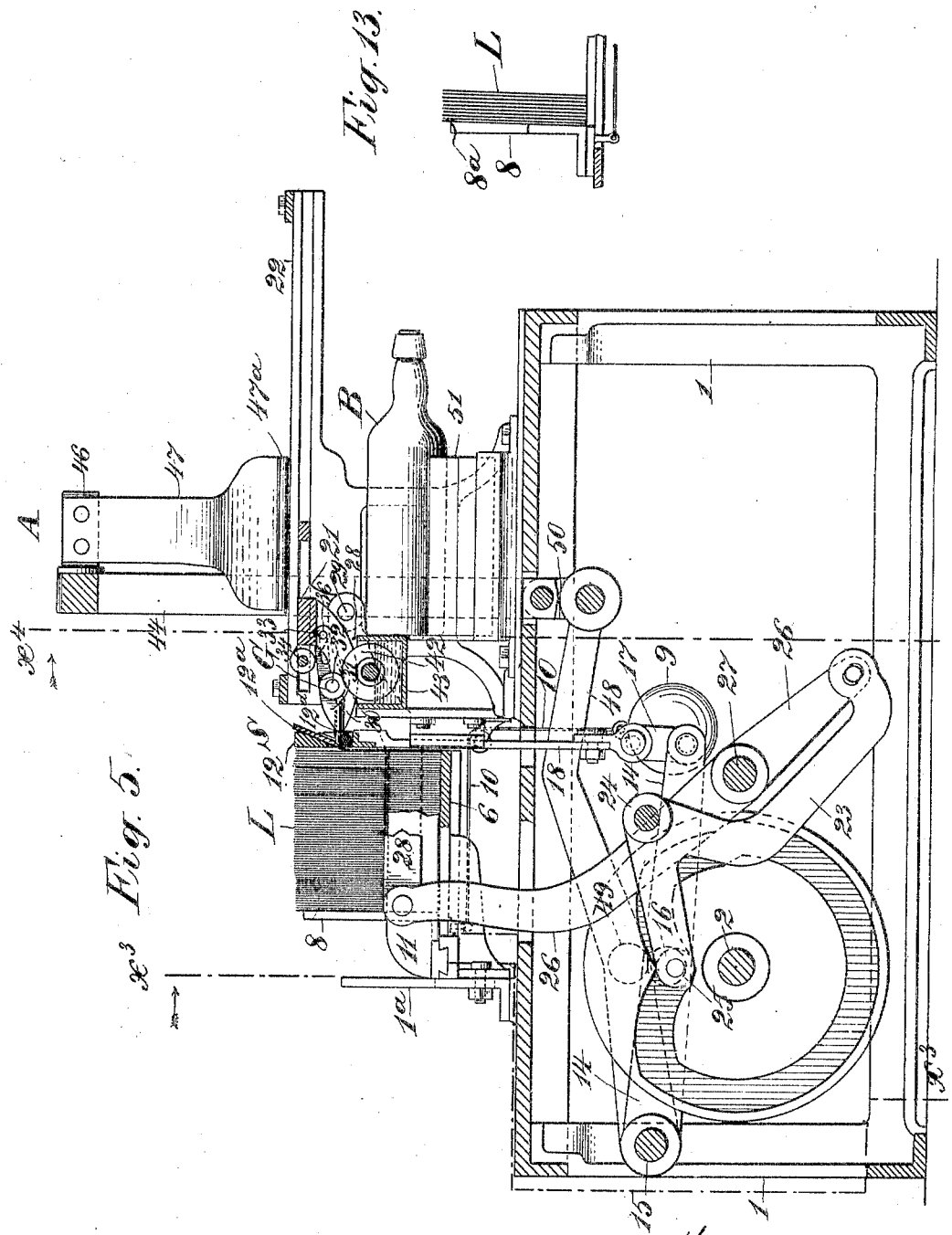

No. 777,041. PATENTED DEC. 6, 1904.
H. MAUST.
LABEL AFFIXING MACHINE.
APPLICATION FILED DEC. 11, 1903.
NO MODEL. 6 SHEETS—SHEET 5.
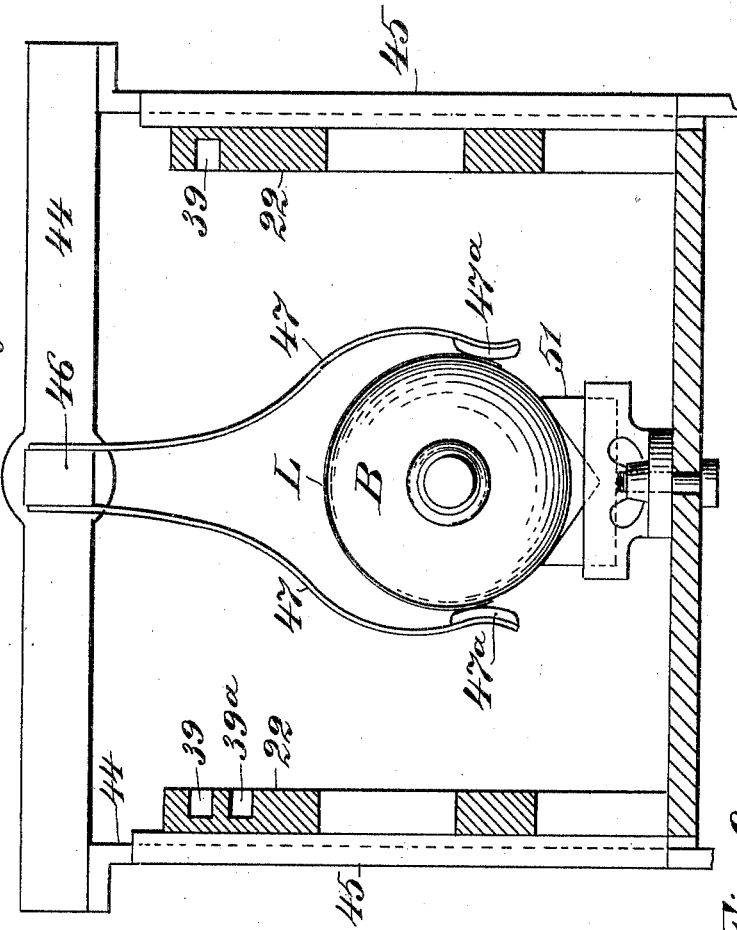
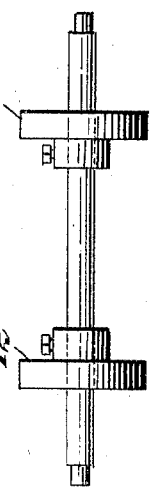
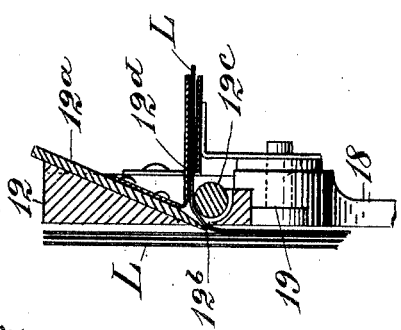

No. 777,041. PATENTED DEC. 6, 1904.
H. MAUST.
LABEL AFFIXING MACHINE.
APPLICATION FILED DEC. 11, 1903.
NO MODEL. 6 SHEETS—SHEET 6.
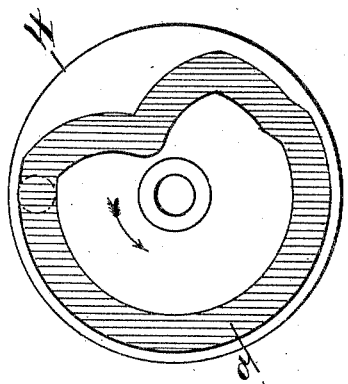
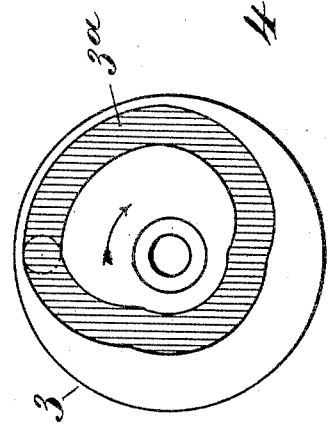
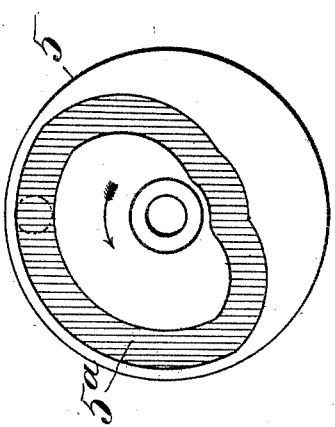

No. 777,041. Patented December 6, 1904.

UNITED STATES PATENT OFFICE.

HARRY MAUST, OF BROOKLYN, NEW YORK.

LABEL-AFFIXING MACHINE.

SPECIFICATION forming part of Letters Patent No. 777,041, dated December 6, 1904.

Application filed December 11, 1903. Serial No. 184,738. (No model.)

*To all whom it may concern:*

Be it known that I, HARRY MAUST, a citizen of the United States, residing in the borough of Brooklyn, in the county of Kings and State of New York, have invented certain new and useful Improvements in Label-Affixing Machines, of which the following is a specification.

This invention relates to the class of machines which are employed for affixing gummed or pasted labels to bottles and similar cylindrical or rounded articles; and the object of the present invention is to provide an automatic machine which will segregate a label from a pile or pack of the same, apply adhesive material thereto, place the label in position, and apply and fix it to the bottle or other article. The machine is set in motion, and its main shaft makes one revolution and stops, the complete operation of affixing one label being effected by a single rotation of the said shaft. The ordinary automatic clutch device for setting the machine in motion and stopping it at the end of each operation may be employed; but this device, as it forms no part of the invention, is not shown herein.

Before proceeding to describe minutely with reference to the accompanying drawings the mechanical details of the machine it will be of advantage to explain that the machine performs, essentially, three operations on the label in their proper order and that these operations are performed by three cams on the main shaft acting through cam-levers. One cam acts on a vertically-moving segregating blade or device to separate or part off the first label from the pack and place it in position to be seized and drawn out. Another cam operates a reciprocating gripper, which seizes the turned-over upper margin of the separated label, draws the latter out and over the paste-applying roll, and carries it back into position to be applied to the bottle. The third cam operates the vertically-reciprocating affixing device. This device consists of two spring-blades which descend upon the label resting on the bottle and by spreading as they are pressed down smooth the label about the body of the bottle. The parts return to their first positions and the machine stops. The labels are kept pressed up to the segregator by suitable automatic means and the attendant merely supplies and removes the bottles. Means are provided for automatically opening and closing the jaws of the gripper at proper times for supporting the bottle or other article in position to receive the label and for adjusting the machine to suit labels of different dimensions and bottles of different sizes.

In the accompanying drawings, which illustrate an embodiment of the invention, Figure 1 is a side elevation of the machine. Fig. 2 is a plan of the same. Fig. 3 is a vertical transverse section taken substantially at line $x^3$ in Fig. 5. Fig. 4 is a vertical transverse section taken substantially at line $x^4$ in Fig. 5. Fig. 5 is a vertical longitudinal section of the machine, taken substantially at line $x^5$ in Fig. 2, but showing the parts in a position different from that seen in Fig. 1. These are all general views of the machine. The other views are on a larger scale. Fig. 6 is a face view of the switch device for opening the gripper, the view showing also the gripper construction. Fig. 7 is a cross-section of the segregating device on a large scale. Fig. 8 is a view illustrating the operation of the spring-fingers for applying the label to the bottle. Fig. 9 is a view of the paste-applying roller detached. Figs. 10, 11, and 12 are face views of the cams. Fig. 13 is a detail view showing the preferred construction of the follower behind the labels. Fig. $6^a$ is a fragmentary sectional view at line $x^{6a}$ in Fig. 6, showing the spring-switch in plan.

It may be stated here that in the principal views, Figs. 1, 2, 3, and 4, the parts are shown in the position of rest, or at the position for starting, and Fig. 5 shows the parts as they will be when the gripper shall have advanced and grasped a label.

1 designates in general the frame of the machine in which the moving parts are mounted, and 2 designates the main shaft on which are the three operating-cams 3, 4, and 5. Preferably these cams will be disks, each with a cam-groove in its lateral face.

On the frame 1 (at the left in Figs. 1, 2, and 5) is mounted the platform 6, supporting the pack of upright labels L. The platform 6 is adjustable up and down on an upright portion 1ᵃ of the frame, and in a dovetail groove 7 in the platform and extending lengthwise of the machine is slidably mounted a follower 8 behind the pack of labels L. This follower has a weight 9 coupled to it by a cord 10, which causes the follower to press the pack of labels up to the segregator, to be hereinafter described. The labels rest sidewise on the platform with their backs presented toward the segregator, and mounted on the platform 6, so as to be adjusted transversely of the same, are two end guides or stops 11 for the labels.

The segregator S comprises an arm 12, hinged to the frame at 13. It is provided with a beveled blade or bit 12ᵃ, somewhat of the character of a planing-bit, which projects slightly through a slot 12ᵇ in the arm, a freely-revolving roller 12ᶜ, adjacent to said slot, and a deflector 12ᵈ. These parts 12ᵃ, 12ᶜ, and 12ᵈ are at the back of the segregator-arm, which latter presents a smooth vertical face to the pack of labels. As seen in Fig. 3, the arm 12 of the segregator stands inclined when it is elevated, and the edge of the bit 12ᵃ will then be raised just high enough to clear the corner of the pack of labels. When the cam 3, which operates the segregator, draws the arm down, the said bit, which projects just the thickness of a label, enters behind the first label at the corner of the latter and gradually separates it from the others. When the segregator shall have descended to its lowest position with the slot 12ᵇ horizontal, it will be found that the upper edge of the segregated label will have passed through said slot over the roller 12ᶜ and been deflected by the deflector 12ᵈ into a substantially horizontal position. As the slot will be below the tops of the labels in the pack, (say one and one-half inches if the label is five inches wide,) there will be a considerable margin of the label projecting at the back of the segregator.

The means between the cam 3 and the segregator-arm 12 for operating the latter comprise a cam-lever 14, fulcrumed at 15 on the frame and provided with a stud 16, which engages a cam-groove 3ᵃ in the cam. At its free end the lever 14 is coupled by a link 17 to a flat upright link 18, which is coupled at 19 to the arm 12 of the segregator. The link 18 is flush with the face of the arm of the segregator, and this link, together with a similar strip 18ᵃ, which is free at its lower end and plays in a fixed guide, serves as an abutment for the labels to press up to or against. The arm of the segregator may also have pendent portions (20 in Fig. 3) to also aid as abutments for the labels.

When the label shall have been segregated and its upper margin bent over as described, it is seized by the gripper and drawn out. This gripper (designated as a whole by G) is carried by a cross-head 21, mounted to slide in horizontal guideways in the side frames 22 of the machine. This cross-head is reciprocated by the cam 4 through the following intermediate mechanism. A bent lever 23 is fulcrumed on the frame at 24 and carries on one arm a stud 25, which plays in a cam-groove 4ᵃ in the cam 4. At its other arm the lever 23 is coupled to the lower arm of a lever 26, fulcrumed at 27 on the frame, and the upper arm of the lever 26 is coupled by a link 28 to the cross-head 21 at 29. Through this mechanism an irregular reciprocating motion is imparted to the cross-head and gripper.

The gripper G consists of a lower fixed jaw 30 and an upper movable jaw 31, hinged to the lower jaw at 32 and having a slotted tail 33. A rock-shaft 34 is mounted in the cross-head, and on this shaft is an arm 35, having a stud 36, which engages the slot in said tail. By rocking the shaft 34 the jaws of the gripper are made to close or open. In order to open and close the gripper-jaws automatically and at the proper times, the following mechanism is employed: This mechanism (best seen in Fig. 6) comprises a crank-arm 37 on the rock-shaft 34 and provided with a stud 38, which travels in a switchway in the side frame. This switchway consists of two parallel grooves 39 and 39ᵃ in the side frame, one of which, as herein shown, forms also the guideway for the cross-head. These grooves are disposed one above the other and have at their respective front and rear ends oblique connecting-grooves 40 and 40ᵃ and spring-switches 41 and 41ᵃ. As the cross-head moves forward toward the label-platform the stud 38 plays along the upper groove 39, holding the jaws of the gripper open, and when the open jaws shall have embraced the edge of the label turned toward them the stud 38 will pass down the forward connecting-groove 40, displacing the spring-switch 41 and closing the jaws on the label. The motion is now reversed and the switch 41 compels the stud 38 to return by the lower groove 39ᵃ with the jaws of the gripper closed. The gripper draws the segregated label out through the slot 12ᵇ and over the roller 12ᶜ, which latter is merely to reduce the friction. As the label is drawn out to the rear its back or lower face is drawn over the paste-applying roller 42, rotatively mounted in a fountain 43, and this roller applies the necessary paste for affixing the label. As the cross-head nears the outer end of its travel it brings the label to the affixing-point, and at this point the cross-head rests for an instant for the affixing-fingers to descend to the label and then moves on, the stud 38 now passing up the oblique connecting-groove 40ᵃ and by the switch 41ᵃ into the upper groove 39, thus opening the gripper-jaws. In the meantime when the gripper shall have fairly set free and cleared the label the affixer will have descended upon the latter, and this affixing device A, with its operating mechanism, will now be described.

An upright frame 44 is slidably mounted in guides 45 in the main frame and carries at its upper part on a stud 46 two pendent spring fingers or blades 47. (Best seen in Figs. 4 and 8.) The cam 5 imparts an irregular reciprocating movement to the frame 44 through the medium of a cam-lever 48, fulcrumed on the frame at the point 15. This lever has a stud 49, which plays in a cam-groove $5^a$ in the cam 5 and is coupled by a link 50 to the frame 44. Before explaining how the fingers 47 operate it may be well to explain first that the paste-roller 42 consists, preferably, as shown in Fig. 9, of a shaft on which are adjustably secured two relatively narrow rolls or disks, adapted to supply only two strips of paste to the label at its respective ends only, and also to explain that the bottle B, to which the label is to be affixed, rests in a V-shaped cradle 51, mounted in the frame below and in the path of the fingers 47. This cradle is adapted to take either pint or quart bottles, having a removable upper section to support the smaller bottle. The bottle B having been placed in the cradle with its bottom in contact with the back of the fountain 43 or with some other limiting-guide and the label placed in position thereon by the gripper, the fingers 47, which may be curved outward at their tips $47^a$ and these be covered with rubber or other soft material, descend upon the label and being spread apart as they are pressed down by the round body of the bottle smooth the label and apply it snugly to the bottle. The operation is clearly indicated in Fig. 8. When the parts are at rest at the beginning of the operation, the segregator S and affixer A will be elevated and the gripper G at the end of its rear or out stroke. The studs in the several cam-grooves $3^a$, $4^a$, and $5^a$ will occupy the positions seen in Figs. 10, 11, and 12. When the shaft 2 is set in motion, the cam 3 at once depresses the arm 12 of the segregator and holds the arm depressed for about one-third of a revolution. The cam 4 sets the gripper in motion toward the labels at about the same time and it does not rest at the end of its forward stroke or travel, but grasps the label and moves back again. The cam 5 does not begin to depress the affixer A until the cross-head is back out of the way, and it holds the fingers 47 depressed for a short interval.

One important feature of the above-described machine is the construction whereby the blade or bit $12^a$ takes first behind the label at one corner thereof and in moving down to a final horizontal position gradually takes behind the entire upper edge of the label.

It will be understood that this invention is not limited to the cams and cam-levers shown for operating the parts, as other equivalent mechanisms may be employed for the purpose without departing from the invention in any material degree. The roller 42 for applying the adhesive material to the labels might also be driven by other means than the label itself in passing over it, but such mechanism is known for operating paste-applying rollers, and it has not been considered essential to this invention to show such mechanism herein, nor is the use of such mechanism essential to the operation of this machine.

In Fig. $6^a$ the spring 52, which holds the switch 41 or $41^a$, as the case may be, in its normal position, is clearly shown. This may be a coil-spring one end of which is secured to the journal of the switch and the other to the side frame.

Fig. 13 shows the preferred form of the follower 8, which presses the labels up to the segregating-point. It is desirable that this follower should press with the most force on the labels at the point $8^a$ near their upper edges, so as to leave the lower part of the label as it is being drawn out free from undue friction. This may be conveniently effected by so beveling the face of the follower 8, as seen in this figure, that only its upper edge presses forcibly on the labels. This bevel or incline is too slight to show clearly in the views on a smaller scale.

Having thus described my invention, I claim—

1. A machine for the purpose specified, having means for supporting the pack of labels, a moving segregator comprising a slotted arm, a bit projecting at said slot a distance equal to the thickness of a label, and means for pressing the labels up to the segregator.

2. A machine for the purpose specified, having means for supporting the pack of labels, a moving segregator comprising a hinged and swinging arm 12, furnished with a projecting bit or blade $12^a$, a roller $12^c$ thereat, and a deflector $12^d$, and means for pressing the labels up to the segregator.

3. A machine for the purpose specified, having a platform to support a pack of labels, resting on their edges, means for pressing said pack of labels up to the segregating-point, and means for segregating and deflecting the margin of the outermost label of the pack, said means comprising a part moving in a plane parallel with the face of the label and provided with a projecting bit or blade which first engages the corner of the outermost label, substantially as set forth.

4. A machine for the purpose specified, having a support on which the labels rest on edge, yielding means for pressing the pack of labels up to the segregating-point, and means for segregating the outermost label of the pack, said means comprising a rotating cam, a cam-lever operated by said cam, an arm 12, hinged or pivoted to a fixed point at 13 below the level of the tops of the labels, and having in it a slot $12^b$, a bit or blade $12^a$, carried by said arm and projecting beyond the face of same at said slot, a roller $12^c$ carried by said arm at its back and disposed along the lower margin of said slot and a deflector $12^d$ on the arm at its back and above the slot therein, and said machine having also means coupling said arm 12 with the cam-lever, substantially as set forth.

5. A machine for the purpose specified, having a support for a pack of labels, means for segregating the outermost label of the pack and bending over its margin away from the pack, a reciprocating gripper for seizing, withdrawing and placing the label, means for applying an adhesive material to the back of the label as the gripper moves it, and reciprocating means for affixing the label to the bottle.

6. A machine for the purpose specified, having a support for the labels, means for segregating the outermost label of the pack and bending over its margin away from the pack, a reciprocating gripper for seizing, withdrawing and placing the segregated label, a paste-fountain below the path of the gripper, a paste-applying roller rotatively mounted in said fountain and over which the label is drawn by the gripper, and reciprocating fingers for applying the label.

7. A machine for the purpose specified, having a support for the pack of labels, a follower which presses on the labels most forcibly near their upper edges thus compressing most the said upper edge of the pack, means for segregating the outermost label of the pack and bending over its margin away from the pack, reciprocating means for withdrawing and placing the segregated label, means for applying an adhesive material to the back of the label as it is moved, and means for affixing the label to the bottle.

8. In a machine for the purpose specified, a gripper device comprising a reciprocating cross-head 21, a fixed gripper-jaw 30 on said cross-head, a movable gripper-jaw 31 having a slotted tail 33, a rock-shaft 34, in the cross-head, an arm 35 on said shaft and provided with a stud engaging the slot in said tail, a switchway, consisting of a side frame provided with two parallel grooves connected at their ends by oblique grooves, and spring-switches in said grooves, and a crank-arm 37 on the rock-shaft 34 and provided with a stud which engages and plays along said grooves.

9. A machine for the purpose specified, having means for supporting the pack of labels, a moving segregator comprising a swinging arm provided with a projecting bit or blade and a deflector for bending the edge of the segregated label over and away from the pack, and means for pressing the labels up to the segregator.

10. A machine for the purpose specified, having means for supporting a pack of labels, a follower which bears most forcibly on the labels at the upper part and presses them up to the segregating-point, and a moving segregator comprising a slotted arm provided with a bit projecting from the slot a distance equal to the thickness of the label, and with a deflector for the upper edge of the label.

In witness whereof I have hereunto signed my name, this 9th day of December, 1903, in the presence of two subscribing witnesses.

HARRY MAUST.

Witnesses:
HENRY G. HOSE,
HENRY CONNETT.